Figure 1:
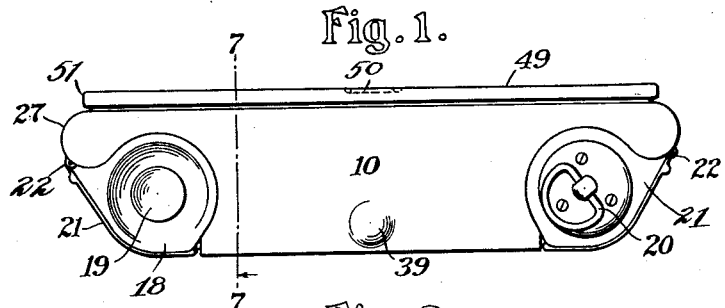

B. J. NASIEF.
FOLDING CAMERA.
APPLICATION FILED OCT. 28, 1914.

1,154,046.

Patented Sept. 21, 1915.
2 SHEETS—SHEET 1.

Witnesses:
Clarence W. Carroll
D. Gurnee

Inventor:
Benjamin J. Nasief
by his attorneys
Davis & Dorsey

B. J. NASIEF.
FOLDING CAMERA.
APPLICATION FILED OCT. 28, 1914.

1,154,046.

Patented Sept. 21, 1915.
2 SHEETS—SHEET 2.

Witnesses:
Clarence W. Carroll
D. Gurnee

Inventor:
Benjamin J. Nasief
by his attorneys
Davis & Dorsey ns.# UNITED STATES PATENT OFFICE.

BENJAMIN J. NASIEF, OF ROCHESTER, NEW YORK.

FOLDING CAMERA.

1,154,046.  Specification of Letters Patent. Patented Sept. 21, 1915.

Application filed October 28, 1914. Serial No. 869,153.

*To all whom it may concern:*

Be it known that I, BENJAMIN J. NASIEF, a subject of the Sultan of Turkey, and resident of Rochester, in the county of Monroe and State of New York, have invented certain new and useful Improvements in Folding Cameras, of which the following is a specification.

This invention relates to folding cameras of a well-known type, in which extensible means, such as a hinged front door, are employed for supporting the lens, the shutter, and the bellows, when the bellows are extended for use, and in which the bellows, when the camera is not in use, are folded flat into a space between the film-roll holders at the ends of the body of the camera.

The object of the invention is to produce a camera, of the type in question, which will fold into a more compact form than those heretofore constructed. To this end I utilize a space which, in the ordinary construction, is not utilized when the camera is folded, namely, the space in front of the focal plane and adjacent the film-roll holders which is occupied by the bellows when in extended position, but is unoccupied when the bellows are folded flat. Accordingly, instead of the usual fixed roll-holding compartments at the ends of the camera-body, I employ film-roll holders which are movably connected with the body of the camera, so that they may be moved into and out of the space in question, according as the camera is in folded or unfolded condition. In order that the film-roll holders may be moved, relatively to the body of the camera, without interference with the movement of the film-strip and the maintenance of the proper tension upon it, I preferably connect them pivotally with the body of the camera, by means of light-tight hinges, and cause the film-strip to be drawn through these hinges and guided by rollers, or other suitable guides, located at points approximately coincident with the axes of the hinges. To facilitate the folding and unfolding of the camera, I preferably connect the film-roll holders with the folding means by which the bellows are supported in such a manner that these parts may be actuated simultaneously, by a single manual operation, so that the camera of the present invention may be folded or unfolded with the same facility as a camera of ordinary form.

Other features of the invention will be set forth hereafter, in connection with the following description of the illustrated embodiment of the invention.

Figure 2:
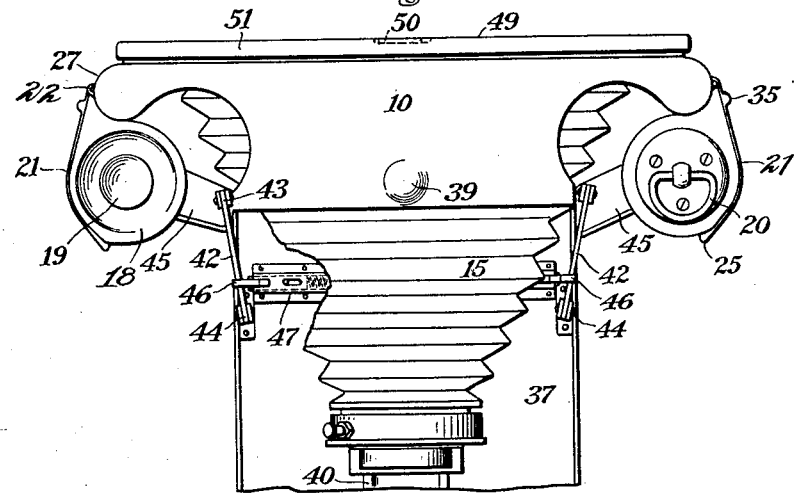
Figure 3:
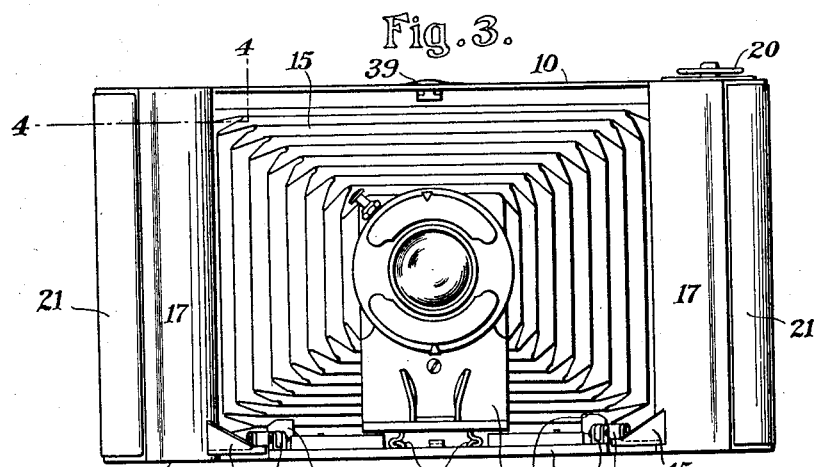
Figure 4:
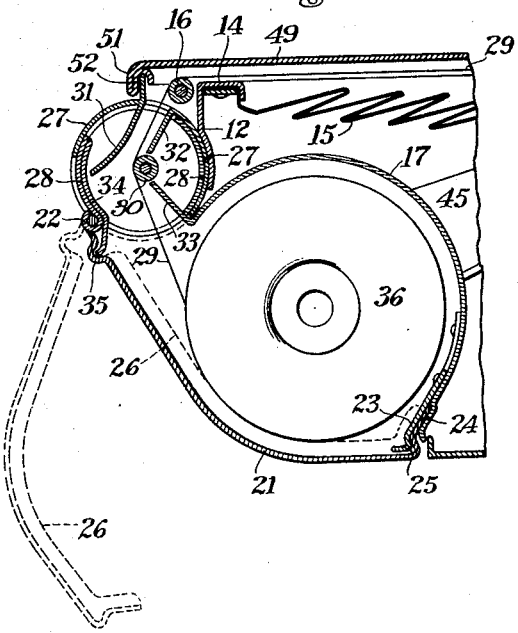
Figure 5:
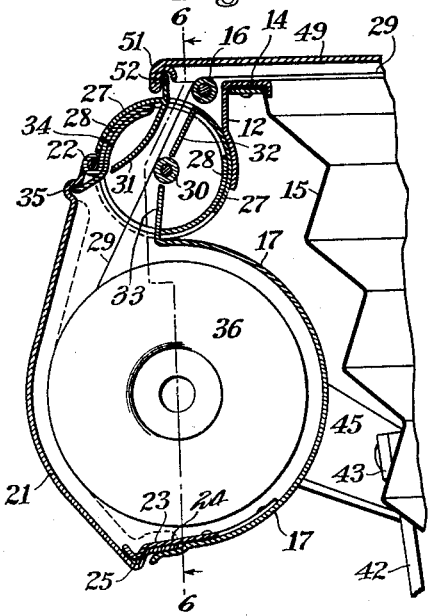
Figure 6:
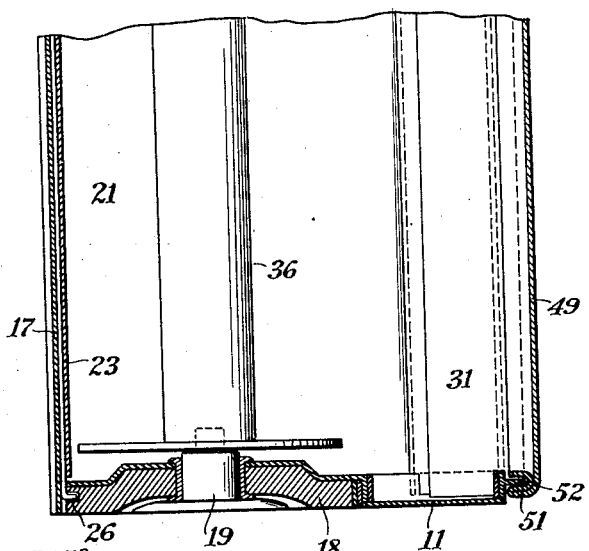
Figure 7:
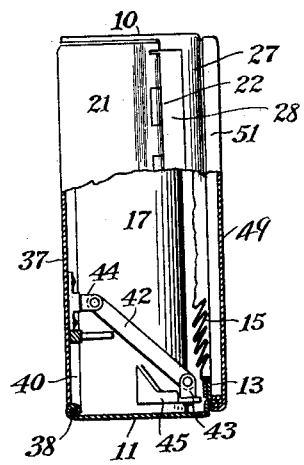

In the accompanying drawings:—Figure 1 is a plan-view of a camera embodying the present invention, in its folded condition; Figs. 2 and 3 are, respectively, a plan-view and a front-elevation, showing the camera in its unfolded condition; Fig. 4 is a horizontal section, on a larger scale than the preceding figures, through one end of the camera, showing one of the film-roll holders in folded position; Fig. 5 is a similar view, showing a roll-holder in unfolded position;
Fig. 6 is a partial vertical section, on the line 6—6 in Fig. 5, looking from right to left in the latter figure; and Fig. 7 is an end-elevation of the camera, in folded condition, the lower part of the figure being in vertical section.

The illustrated embodiment of the invention comprises a body having a flat top and bottom, 10 and 11 respectively, connected by end-members 12, as shown in Fig. 4.
This body has the usual exposure-opening surrounded by a frame comprising upper and lower members 13, and end members 14, and the rear end of the bellows 15 is fixed, in the usual manner, to this frame.
The usual guide-rollers 16 are also provided, at the ends of the frame, the film-strip 29 being stretched between these rollers so as to lie in the focal plane of the camera.

Each of the movable film-roll holders comprises a sheet-metal body 17, of generally cylindrical form, closed at the top and bottom by end-pieces 18. In these end-pieces are mounted the usual pivot-studs 19 and winding-key 20, for supporting and actuating the usual film-reels 36. For the introduction and removal of the reels each roll-holder is provided with a sheet-metal cover 21, mounted on hinges 22. A resilient plate 23 is fixed to the inside of the body 17, in position to provide a slot into which the edge 24 of the cover 21 is introduced when the cover is closed, thus making a light-tight joint, and the plate 23 is provided with a ridge 25 which is seated resiliently in a corresponding groove in the cover, so as to maintain the cover normally in closed position but permit it to be opened or closed, owing to the flexibility of the plate 23. The joints at the ends of the cover are made light-tight by means of flanges 26 on the cover, which are seated in grooves in the end-pieces 18 of the roll-holder.

To provide for the pivotal movement of the roll-holder, without interference with the movement of the film-strip, each roll-holder is connected to the body by means of a hinge comprising an outer tubular member 27, which is fixed to the body of the camera, and an inner tubular member 28 which fits the outer member closely but is movable therein. This inner member is fixed to the body of the roll-holder. Both of these tubular members are provided with registering lateral openings, through which the film-strip may be passed in all positions of the film-holder, as shown in Figs. 4 and 5.

Owing to the changes in the position of the roll-holder the film-strip cannot at all times be extended directly from the reel to the guide-roller 16, and accordingly an additional guide is necessary. In order that the length of the extended portion of the film-strip may not be varied by the movements of the roll-holder, this additional guide, which is in the form of a roller 30, is located so as to coincide approximately with the axis of the hinge, but is shown as having its axis of rotation slightly within the axis of the hinge, so that the film-engaging surface of the guide-roller may be more nearly approximated to the latter axis.

The overlapping tubular members of the hinge provide, in themselves, an effective light-tight joint, but for complete security against the admission of light baffles 31 and 32 are fixed to the outer tubular member 27, at its rear film-receiving opening, these baffles extending forwardly, as shown in Figs. 4 and 5, so as to intercept any light which may find its way between the tubular members. For the same purpose a baffle 33 is fixed to the hinge-member 28, and extends toward the guide-roller 30. To guard against leakage of light through the hinge 22, a plate 34 is fixed inside the hinge-member 28, and extends forwardly into position to be seated in a slot 35 in the cover 21, when the cover is closed.

In the illustrated camera the lens, the bellows, and other parts of the camera are supported, when the camera is in unfolded condition, upon a door 37, which normally closes the front of the body, and is connected with the body by hinges 38 at its lower edge. This door is held in closed position by a catch 39 of ordinary form (Fig. 3). The door has the usual rails 40, upon which is mounted the sliding front or lens-support 41 to which the forward end of the bellows is attached. In order that the opening movement of the door 37 may cause a swinging of the film-roll holders to their unfolded position, connections are provided between the door and the film-roll holder, and these connections are utilized also as the means for holding the door in its open or unfolded position, at a right-angle with the focal plane of the camera. For this purpose a link 42 is connected, by a universal joint 43, with a bracket 45 extending from each film-roll holder, the opposite end of each link being connected, by a universal joint 44, with the door 37. The relative arrangement of these parts is such that when the door is swung downwardly, to open position, the roll-holders are swung outwardly and away from each other, and these movements are arrested by the engagement of the links 42 with the forward portions of the brackets 45, when the links have reached horizontal position, at which time the door 37 is in horizontal position, while the roll-holders are in the position of Fig. 5, in which they offer no obstruction to the unfolding of the bellows. The links 42, as just described, arrest the downward or unfolded movement of the door 37, and in order that they may also be utilized to prevent the door from returning from this position, catches 46 are employed, these catches being mounted on spring-pressed stems 47 which move in guides on the door, as shown in Figs. 2 and 3. The beveled ends of these catches are repressed by, and then engaged with, the links 42 when the door is opened, and when it is necessary to fold the camera the catches may be repressed manually to disengage them from the links.

To facilitate the introduction of the film-strip into the camera, the body is closed at the rear, in the usual manner, by a removable cover 49, which may be fixed in place by catches 50 of any suitable form. As a convenient provision for a light-tight joint between the cover and the body, the cover is bent at its margins 51, to provide slots which receive a flange 52 projecting from the rear of the body.

It will be apparent that by the construction and arrangement hereinbefore described I have produced a folding camera of which the length, when folded, is little greater than the length of the portion of the film-strip which is maintained extended in the focal plane, and accordingly, this camera is much more compact than a camera of the usual form and construction, in which the roll-holding chambers are arranged in positions entirely beyond the ends of the focal plane.

While the invention has been illustrated in a camera in which the support for the bellows is in the form of a hinged door, the invention is not limited to this construction, and it will be apparent, in general, that the invention is not limited to the embodiment thereof hereinbefore described and illustrated in the accompanying drawings, but the support in its operative unfolded position.

10. In a folding camera, the combination, with a body and film-roll holder, of a pivotal connection comprising two concentric tubular members fixed to the body and the roll-holder, respectively, and provided with lateral openings for the passage of a filmstrip; and a guide-roller substantially co-axial with the tubular members.

11. In a folding camera, the combination, with a body and a film-roll holder, of a pivotal connection comprising two concentric tubular members fixed to the body and the roll-holder, respectively, and provided with lateral openings for the passage of a filmstrip; a guide-roller substantially co-axial with the tubular members, and baffles extending, from the lateral margins of said openings, partly across the space within the inner tubular member.

In testimony whereof, I affix my signature in presence of two witnesses.

BENJAMIN J. NASIEF.

Witnesses:
C. W. CARROLL,
D. GURNEE.

Copies of this patent may be obtained for five cents each, by addressing the "Commissioner of Patents, Washington, D. C."

that it may be embodied in various other forms within the nature of the invention as it is defined in the following claims.

I claim:—

1. In a folding camera, the combination, with a body adapted to hold a film-strip extended in the focal plane, bellows attached to the body, and a folding support for holding the bellows in extended position; of film-roll holders movably connected with the body and movable toward and from each other in a portion of the space, in front of the focal plane, occupied by the bellows when extended.

2. In a folding camera, the combination, with a body adapted to hold a film-strip extended in the focal plane, bellows attached to the body, and a folding support for holding the bellows in extended position; of film-roll holders movably connected with the body and movable toward and from each other in a portion of the space, in front of the focal plane, occupied by the bellows when extended, and connections, between the roll-holders and said folding support, for causing the holders and the support to be moved in unison in folding or unfolding the camera.

3. In a folding camera, the combination, with a body adapted to hold a film-strip extended in the focal plane, bellows attached to the body, and a folding support for holding the bellows in extended position; of film-roll holders pivoted to the body and movable toward and from each other in a portion of the space, in front of the focal plane, occupied by the bellows when extended, and guides, for the film-strip, substantially coincident with the pivotal axes of the roll-holders.

4. In a folding camera, the combination, with a body adapted to hold a film-strip extended in the focal plane, bellows attached to the body, and a folding support for holding the bellows in extended position; of film-roll holders pivoted to the body and movable toward and from each other in a portion of the space, in front of the focal plane, occupied by the bellows when extended; the pivotal connections between the roll-holders and the body comprising concentric tubular members with lateral openings for the passage of the film-strip.

5. In a folding camera, the combination, with a body adapted to hold a film-strip extended in the focal plane, bellows attached to the body, and a folding support for holding the bellows in extended position; of film-roll holders pivoted to the body and movable toward and from each other in a portion of the space, in front of the focal plane, occupied by the bellows when extended; the roll-holders having lateral openings, for the insertion and removal of film-reels, and light-tight closures for said openings.

6. In a folding camera, the combination, with a body adapted to hold a film-strip extended in the focal plane, bellows attached to the body, and a door, hinged at the front of the body and adapted, when swung to open position, to serve as a support for the bellows when the bellows are in extended position; of film-roll holders pivoted to the body and movable toward and from positions, in front of the body, which are occupied by the bellows when extended; and links connected, by universal joints, to the door and each roll-holder respectively, for causing the roll-holders to be moved in unison with the opening and closing movements of the door.

7. In a folding camera, the combination, with a body adapted to hold a film-strip extended in the focal plane, bellows attached to the body, and a door, hinged at the front of the body and adapted, when swung to open position, to serve as a support for the bellows when the bellows are in extended position; of film-roll holders pivoted to the body and movable toward and from positions, in front of the body, which are occupied by the bellows when extended; and links connected, by universal joints, to the door and each roll-holder respectively, for causing the roll-holders to be moved in unison with the opening and closing movements of the door, said links serving also as means for supporting the door in open position.

8. In a folding camera, the combination, with a body adapted to hold a film-strip extended in the focal plane, bellows attached to the body, and a door, hinged at the front of the body and adapted, when swung to open position, to serve as a support for the bellows when the bellows are in extended position; of film-roll holders pivoted to the body and movable toward and from positions, in front of the body, which are occupied by the bellows when extended; links connected, by universal joints, to the door and each roll-holder respectively, for causing the roll-holders to be moved in unison with the opening and closing movements of the door; and catches for securing the door and the links against relative movement when the door is in fully open position.

9. In a folding camera, the combination, with a body adapted to hold a film-strip extended in the focal plane, bellows attached to the body, and a folding support for holding the bellows in extended position; of film-roll holders pivoted to the body and movable toward and from each other in a portion of the space, in front of the focal plane, occupied by the bellows when extended; and connections, between the roll-holders and said folding support, for causing the holders and the support to be moved in unison in folding or unfolding the camera, said connections serving also as means for retaining